US012104434B1

(12) United States Patent
Li et al.

(10) Patent No.: US 12,104,434 B1
(45) Date of Patent: Oct. 1, 2024

(54) HIDEABLE BAY WINDOW

(71) Applicant: A&C Future Inc, Newport Beach, CA (US)

(72) Inventors: Sichen Li, Santa Ana, CA (US); Jiuqi Wang, Santa Ana, CA (US); Zhuangboyu Zhou, Santa Ana, CA (US); Ju Gao, Newport Beach, CA (US); Shoue Chen, Irvine, CA (US); Pengcheng Wang, Santa Ana, CA (US); Han Qin, Newport Beach, CA (US); Jiayang Qin, Newport Beach, CA (US)

(73) Assignee: A&C Future Inc

( * ) Notice: Subject to any disclaimer, the term of this patent is extended or adjusted under 35 U.S.C. 154(b) by 0 days.

(21) Appl. No.: 18/191,866

(22) Filed: Mar. 28, 2023

(51) Int. Cl.

| | |
|---|---|
| ***E06B 3/92*** | (2006.01) |
| ***E05F 11/04*** | (2006.01) |
| ***E05F 11/08*** | (2006.01) |
| ***E06B 1/36*** | (2006.01) |
| ***E06B 3/46*** | (2006.01) |
| ***E06B 5/00*** | (2006.01) |
| ***E06B 9/04*** | (2006.01) |

(52) U.S. Cl.
CPC ................ *E06B 5/00* (2013.01); *E05F 11/04* (2013.01); *E05F 11/08* (2013.01); *E06B 1/363* (2013.01); *E06B 3/4609* (2013.01); *E06B 3/928* (2013.01); *E06B 9/04* (2013.01); *E05Y 2201/484* (2013.01); *E05Y 2201/654* (2013.01); *E05Y 2201/668* (2013.01); *E05Y 2201/694* (2013.01); *E05Y 2900/148* (2013.01)

(58) Field of Classification Search
CPC . E06B 1/363; E06B 3/92; E06B 3/928; E06B 9/115; E06B 2009/1527; B60P 3/341; B60P 3/34
See application file for complete search history.

(56) References Cited

U.S. PATENT DOCUMENTS

| | | | | |
|---|---|---|---|---|
| 2,568,009 A * | 9/1951 | Johnson | E06B 1/363 | 49/71 |
| 3,778,100 A * | 12/1973 | Dillard | B60P 3/34 | 296/26.15 |
| 4,279,454 A * | 7/1981 | Koiso | E06B 9/115 | 312/307 |
| 6,209,944 B1 * | 4/2001 | Billiu | B60J 7/1614 | 296/159 |
| 6,560,937 B1 * | 5/2003 | Gardner | E06B 3/92 | 52/201 |
| 7,731,256 B1 * | 6/2010 | Wivinis | B60P 3/34 | 296/171 |

(Continued)

*Primary Examiner* — Daniel J Troy
*Assistant Examiner* — Susan M. Heschel
(74) *Attorney, Agent, or Firm* — Elizabeth Yang

(57) ABSTRACT

A hideable bay window is provided. The hideable bay window comprises a window frame, a first horizontal turning plate, a second horizontal turning plate, a vertical translation plate, a first vertical sliding assembly, and a second vertical sliding assembly. The hidable bay window further comprises a pair of bottom support mechanisms. Compared to traditional windows, the present window can be transformed between a fixed window status and a bay window status smoothly and allows the space for the windows to be set according to the needs of the user.

10 Claims, 10 Drawing Sheets

(56) References Cited

U.S. PATENT DOCUMENTS

| | | | | |
|---|---|---|---|---|
| 8,141,965 | B2 * | 3/2012 | Nelson | H05K 9/0049<br>312/223.1 |
| 11,351,908 | B2 * | 6/2022 | Hoedl | B60P 3/34 |
| 2018/0050628 | A1 * | 2/2018 | Revelino | B60P 3/34 |

* cited by examiner

A-A

HIDEABLE BAY WINDOW

FIELD OF THE INVENTION

The present invention relates to a hideable bay window. More so, a retractable window system is introduced herein.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In indoor areas, there is a need for facilities or ways to communicate between the indoors and the outdoors, and windows are one of them. There are different types of windows, such as sliding windows, casement windows, fixed windows, and bay windows. The invention is a special window that can switch between a fixed window and a bay window.

Traditional windows have the following characteristics: fixed shape and cannot be changed or adjusted according to the user's preference after installation.

Hence, in order to offer a transformable and easily movable bay window, the present invention is proposed. The invention has the following characteristics: 1. it can shorten the contact distance with the outdoor environment 2. it can change its shape according to the user's mood or preference to improve the quality of life 3, it has a unique and beautiful design 4, when it is closed, it reduces the contact area with the surrounding environment and keeps it clean 5, it is fully enclosed during the process of changing its shape to isolate the indoor environment from the outdoors.

The invention can be used in villas, apartments, office buildings, exhibition halls, mobile homes, RVs, and other indoor areas.

SUMMARY

Illustrative embodiments of the disclosure are generally directed to a foldable solar panel system.

A hideable bay window may be provided. The hideable bay window may have a window frame, a first horizontal turning plate, a second horizontal turning plate, a vertical translation plate, a first vertical sliding assembly, and a second vertical sliding assembly.

The window frame may have a first horizontal edge and a second horizontal edge. The first end of the first horizontal turning plate may be hinged to the first horizontal edge. The second end of the first horizontal turning plate may be slidingly pivoted to the vertical translation plate.

The first end of the second horizontal turning plate may be hinged to the second horizontal edge. The second end of the second horizontal turning plate may be slidingly pivoted to the vertical translation plate.

The window frame may have the first vertical edge and the second vertical edge. The vertical translation plate may have a top protruding portion with a top exterior sliding rail and a bottom protruding portion with a bottom exterior sliding rail.

The top exterior sliding rail and the bottom exterior sliding rail may be set opposite each other to form a pair of exterior sliding rails.

One end of the first vertical sliding assembly may be fixed on the first vertical edge. Another end of the first vertical sliding assembly may be the first sliding end slides in the exterior sliding rails.

One end of the second vertical sliding assembly may be fixed on the second vertical edge. Another end of the second vertical sliding assembly may be the second sliding end slides in the exterior sliding rails.

The first vertical sliding assembly and the second vertical sliding assembly each may consist of a plurality of vertical sliders hinged successively along the sliding direction.

Each vertical slider may have a pair of arcuate protruding portions at one end and a pair of arcuate recessed portions matching the shape and size of the pair of arcuate protruding portions at another end.

Each arcuate recessed portion may have a removable rotation connecting rod. Each arcuate protruding portion may have a rod hole to accommodate the removable rotation connecting rod of another vertical slider.

The removable rotation connecting rod may have a non-threaded portion and a threaded portion. The length of the non-threaded portion may be larger than the length of the rod hole. The arcuate recessed portion may have a threaded hole for the threaded portion of the removable rotation connecting rod.

The vertical translation plate may have a pair of sliding slots. A pair of first horizontal turning plate sliders slide along the sliding slots. A pair of second horizontal turning plate sliders slide along the sliding slots.

The second end of the first horizontal turning plate may be pivoted to the pair of first horizontal turning plate sliders. The second end of the second horizontal turning plate may be pivoted to the pair of second horizontal turning plate sliders.

The vertical translation plate may have a bottom portion having a bottom portion sliding rail. The second horizontal edge may have an edge sliding rail.

A pair of bottom support mechanisms may be mounted between the bottom portion and the second horizontal edge. Each bottom support mechanism may have the first supporting rod, the second supporting rod, and a pivot. The first supporting rod and the second supporting rod cross at the pivot.

One end of the first supporting rod may be rotatably mounted on one end of the second horizontal edge, and another end of the first supporting rod may be slidingly pivoted to the bottom portion sliding rail.

One end of the second supporting rod may be rotatably mounted on one end of the bottom portion. Another end of the second supporting rod may be slidingly pivoted to the edge sliding rail.

The top protruding portion may have the first retraction mechanism and the second retraction mechanism.

The first retraction mechanism may have the first coil spring, the first fixed pulley, and the first steel wire.

The first coil spring may have a first fixed end and a first pull-out end. The first fixed end may be mounted at one end of the top protruding portion. The first fixed pulley may be rotatably mounted near the middle of the top protruding portion. The first steel wire may be wound around the first fixed pulley and connects the first pull-out end and the first sliding end.

The second coil spring may have a second fixed end and a second pull-out end. The second fixed end may be mounted at one end of the top protruding portion. The second fixed pulley may be rotatably mounted near the middle of the top protruding portion. The second steel wire may be wound around the second fixed pulley and connects the second pull-out end and the second sliding end.

Each vertical slider may have the first sealing pad where the vertical slider contacts the first horizontal turning plate. each vertical slider may have a second sealing pad where the vertical slider contacts the second horizontal turning plate.

Each first sealing pad and each second sealing pad may be elastic.

The vertical translation plate may be transparent.

The middle part of the vertical translation plate may have a mounting frame, a transparent panel may be mounted at the mounting frame.

The vertical sliders may be transparent.

The first horizontal turning plate and the second horizontal turning plate may be symmetric. When being rotated, the first horizontal turning plate and the second horizontal turning plate maintain the same angles with the horizontal plane, opposite rotation direction, and same rotation speed.

These, as well as other components, steps, features, objects, benefits, and advantages, will now become clear from a review of the following detailed description of illustrative embodiments, the accompanying drawings, and the claims.

Other systems, devices, methods, features, and advantages will be or become apparent to one with skill in the art upon examination of the following drawings and detailed descriptions. It is intended that all such additional systems, methods, features, and advantages be included within this description, be within the scope of the present disclosure, and be protected by the accompanying claims and drawings.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2A is a schematic view;

FIG. 2B is the perspective top view.

FIG. 3A is a schematic view of a vertical slider.

FIG. 3B is a schematic view of two vertical sliders assembled.

FIG. 3C is a view from direction A in FIG. 3B.

FIG. 3D is the exploded view of two assembled vertical sliders.

FIG. 4A shows a bottom view of the invention in a fully closed state; FIG. 4B shows a perspective bottom view of the invention in a half-open state; FIG. 4C shows a bottom view of the invention in a full-open state.

FIG. 6A is a top view; FIG. 6B is a front view; FIG. 6C is a back view; FIG. 6D is a side view; FIG. 6E is a schematic view.

FIG. 7A is the front view; FIG. 7B is the side view; FIG. 7C is the perspective side view; FIG. 7D is the bottom view; FIG. 7E is the perspective bottom view; FIG. 7F is the back view; FIG. 7G is the schematic view.

FIG. 8A shows a side view of the invention in a fully closed state; FIG. 8B shows a perspective side view of the invention in a half-open state; FIG. 8C shows a side view of the invention in a full-open state.

FIG. 9A is the front view; FIG. 9B is the side view; FIG. 9C is the bottom view; FIG. 9D is the schematic view.

The same reference numerals refer to the same parts throughout the various views of the drawings.

DETAILED DESCRIPTION OF ILLUSTRATIVE EMBODIMENTS

Figure 1:
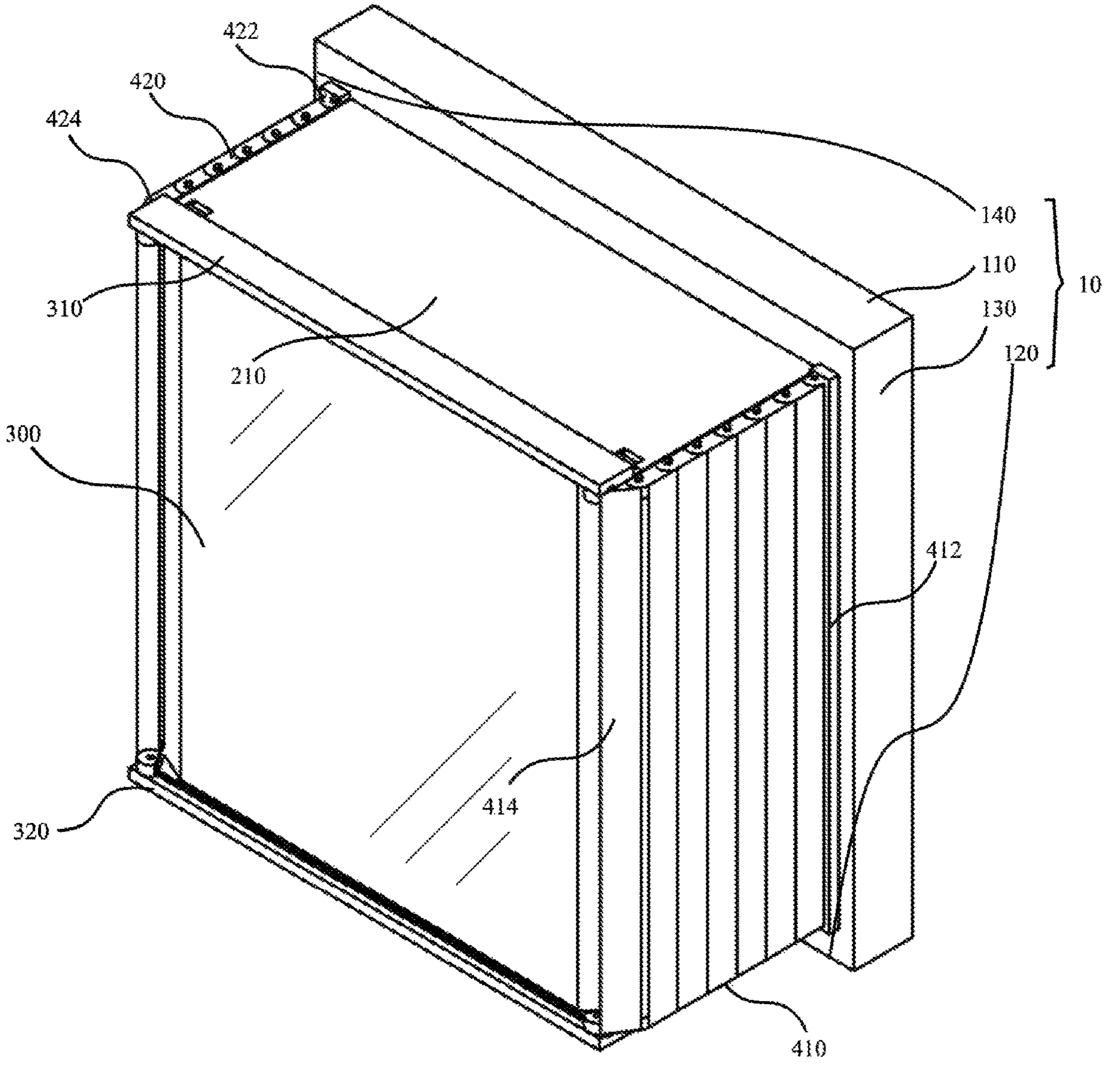
FIG. 1 is a schematic view of the invention in a fully open state.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper,” “lower,” “left,” “rear,” “right,” “front,” “vertical,” “horizontal,” and derivatives thereof shall relate to the invention as oriented in the drawings. Furthermore, there is no intention to be bound by any expressed or implied theory presented in the preceding technical field, background, summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

FIG. 1 is a schematic view of the invention in a fully open state.

The hideable bay window comprises a window frame 10, a first horizontal turning plate 210, a second horizontal turning plate 220, a vertical translation plate 300, a first vertical sliding assembly 410, and a second vertical sliding assembly 420.

Figure 6A:
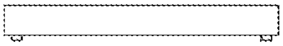
FIG. 6A—FIG. 6E show the different views of the invention in the closed state.
Figure 6B:
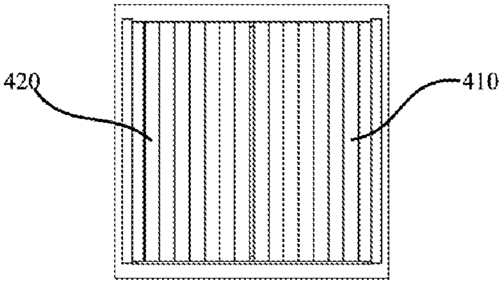
Figure 6E:
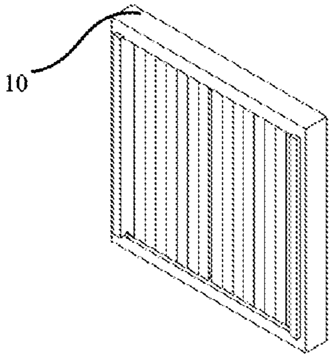
Figure 6D:
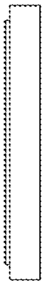
Figure 6C:
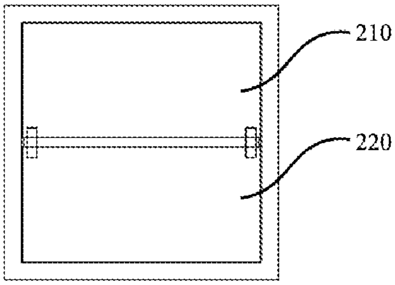
Figure 7A:
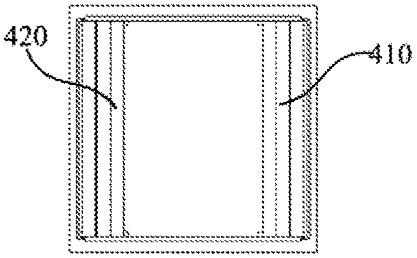
FIG. 7A—FIG. 7G are the multiple views of the invention in a half-open state.
Figure 7B:
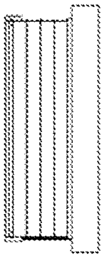
Figure 7C:
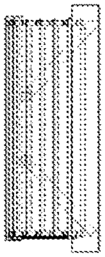
Figure 7D:
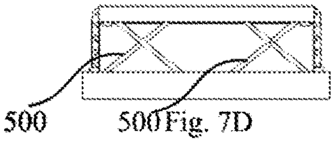
Figure 7E:
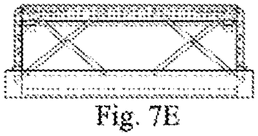
Figure 7F:
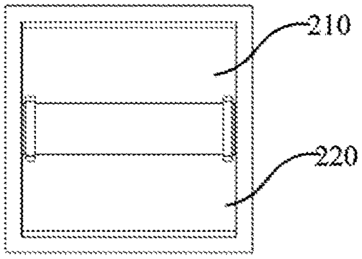
Figure 8A:
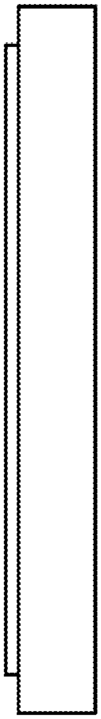
FIG. 8A—FIG. 8C show side views of the invention in different statuses.
Figure 8B:
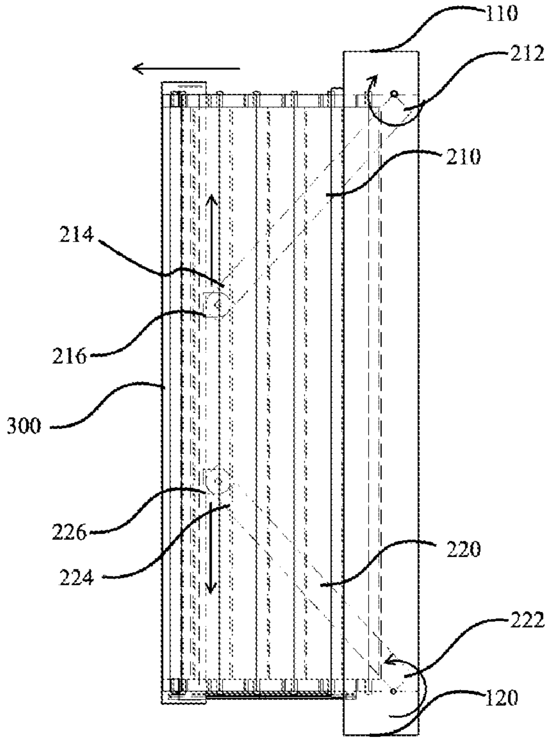

The window frame 10 comprises a first horizontal edge 110 and a second horizontal edge 120; a first end of the first horizontal turning plate 210 is hinged to the first horizontal edge 110; a second end of the first horizontal turning plate 210 is slidingly pivoted to the vertical translation plate 300; a first end 222 of the second horizontal turning plate 220 is hinged to the second horizontal edge 120; a second end 224 of the second horizontal turning plate 220 is slidingly pivoted to the vertical translation plate 300 (Also shown in FIGS. 6C, 7F, 8B).

The window frame 10 comprises a first vertical edge 130 and a second vertical edge 140.

Figure 2A:
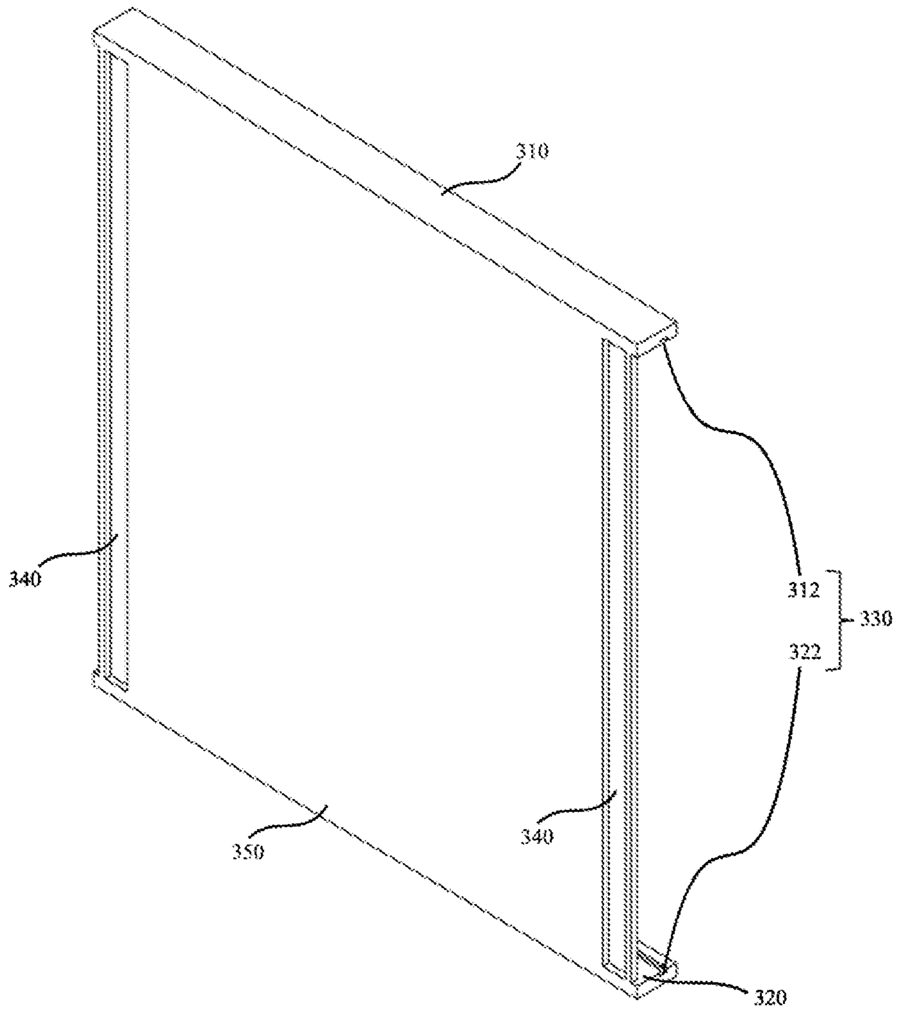
FIG. 2A and FIG. 2B show the vertical translation plate.
Figure 2B:
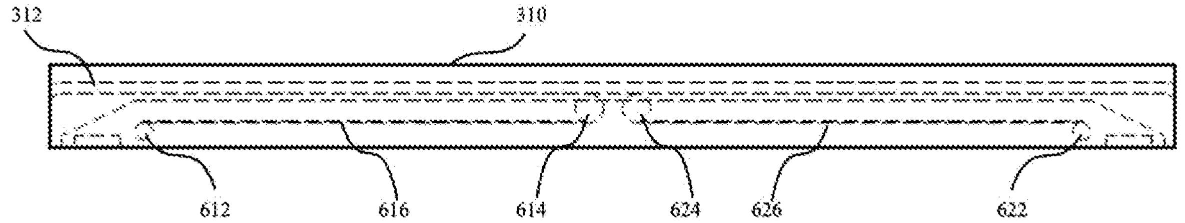

FIG. 2A and FIG. 2B show the vertical translation plate.

FIG. 2A is a schematic view; FIG. 2B is the perspective top view.

The vertical translation plate 300 comprises a top protruding portion 310 with a top exterior sliding rail 312 and a bottom protruding portion 320 with a bottom exterior sliding rail 322. The top exterior sliding rail 312 and the bottom exterior sliding rail 322 are set opposite each other to form a pair of exterior sliding rails 330. The exterior sliding rails 330 are located on the outdoor protruding portion of the vertical translation plate 300. One end 412 of the first vertical sliding assembly 410 is fixed on the first vertical edge 130; another end 414 of the first vertical sliding assembly 410 is a first sliding end 414 slides in the exterior sliding rails 330; one end 422 of the second vertical sliding assembly 420 is fixed on the second vertical edge 140; another end 424 of the second vertical sliding assembly 420 is a second sliding end 424 slides in the exterior sliding rails 330.

The first vertical sliding assembly 410 and the second vertical sliding assembly 420 each consist of a plurality of vertical sliders 400 hinged successively along the sliding direction.

The first vertical sliding assembly 410 and the second vertical sliding assembly 420 are multi-segment structures with symmetry on the left and right sides.

Figure 3A:
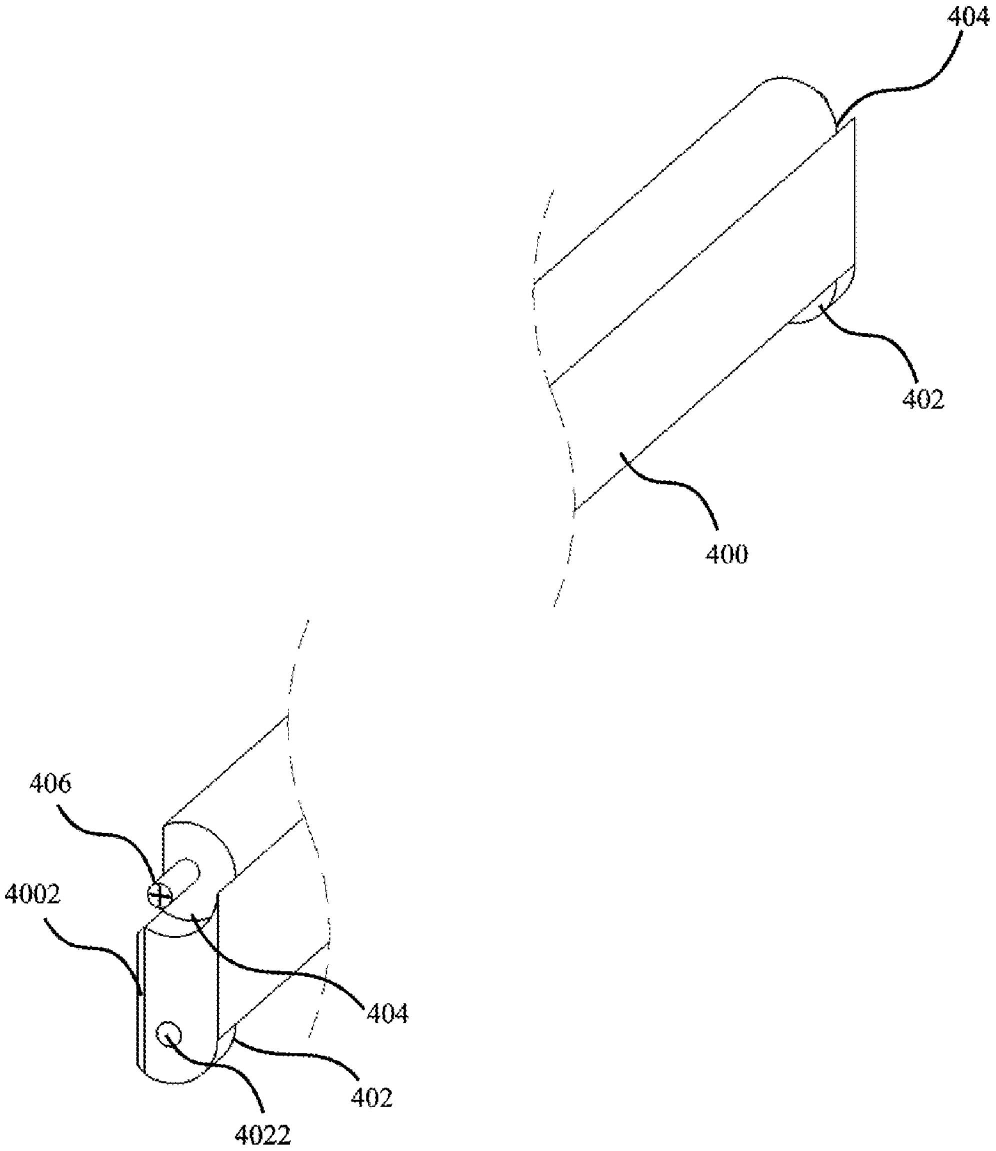
FIG. 3A—FIG. 3D show the vertical slider.
Figure 3B:
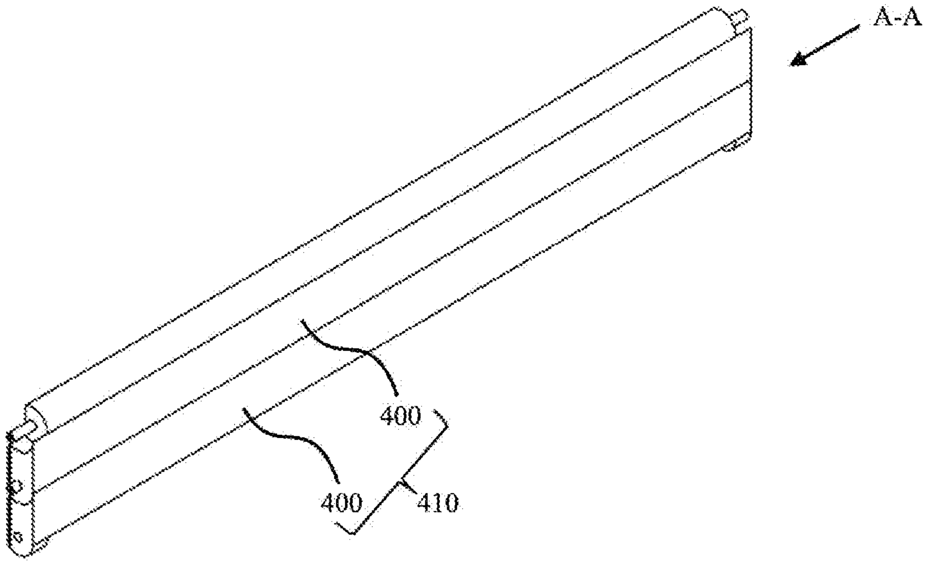
Figure 3C:
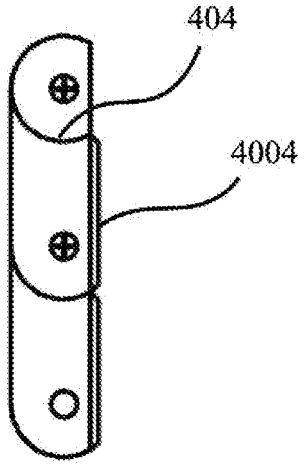

FIG. 3A—FIG. 3D show the vertical slider. FIG. 3A is a schematic view of a vertical slider. FIG. 3B is a schematic view of two vertical sliders assembled. FIG. 3C is a view from direction A in FIG. 3B.

Each vertical slider 400 comprises a pair of arcuate protruding portions 402 at one end and a pair of arcuate recessed portions 404 matching the shape and size of the pair of arcuate protruding portions 402 at another end; each arcuate recessed portion 404 comprises a removable rotation connecting rod 406; each arcuate protruding portion 402 comprises a rod hole 4022 to accommodate the removable rotation connecting rod 406 of another vertical slider.

The curved structure is designed to achieve a sealing effect even when the two vertical sliders 400 can be rotated relative to each other and to isolate the interior from the exterior.

Figure 3D:
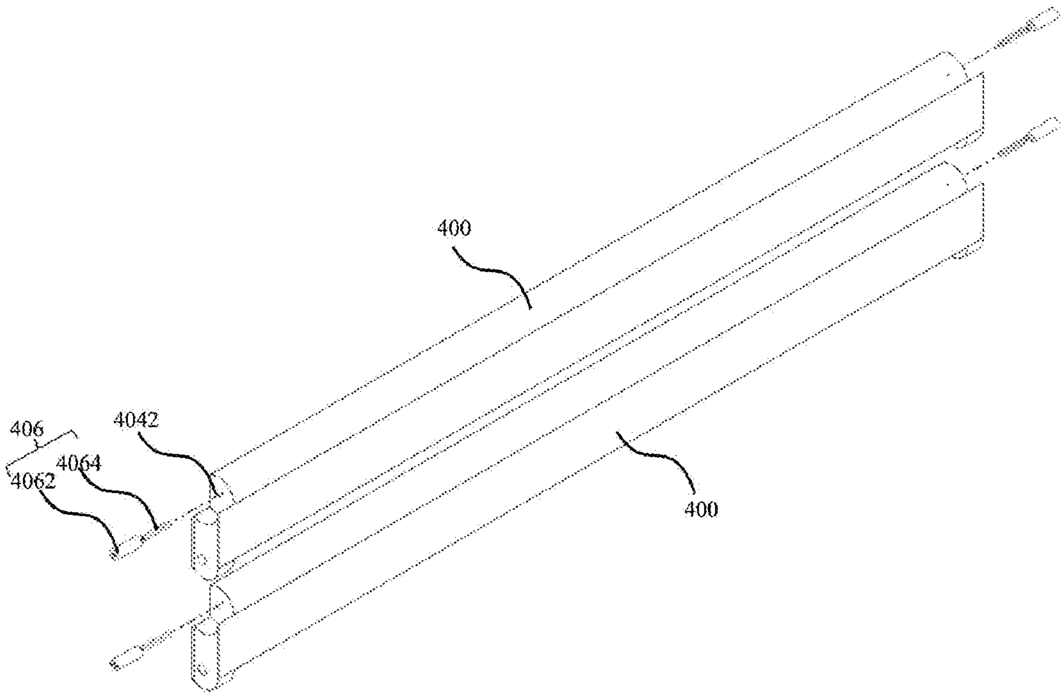

FIG. 3D is the exploded view of two assembled vertical sliders. The removable rotation connecting rod 406 comprises a non-threaded portion 4062 and a threaded portion 4064; length of the non-threaded portion 4062 is larger than the length of the rod hole 4022; the arcuate recessed portion 404 comprises a threaded hole 4042 for the threaded portion 4064 of the removable rotation connecting rod 406. The threaded hole 4042 secures the removable rotation connecting rod 406 to the vertical sliding assembly 410 or 420.

As shown in FIGS. 3B-3C, each vertical slider 400 comprises a first sealing pad 4002 where the vertical slider 400 contacts the first horizontal turning plate 210; each vertical slider 400 comprises a second sealing pad 4004 where the vertical slider 400 contacts the second horizontal turning plate 220.

The sealing pads 4002, and 4004 are in contact with the first horizontal turning plate 210 and the second horizontal turning plate 220 to prevent outdoor rain or air from entering the interior.

In another embodiment, each first sealing pad 4002 and each second sealing pad 4004 are elastic and can be squeezed by the first and second horizontal turning plates 210, and 220 to have a better sealing effect.

Figure 8C:
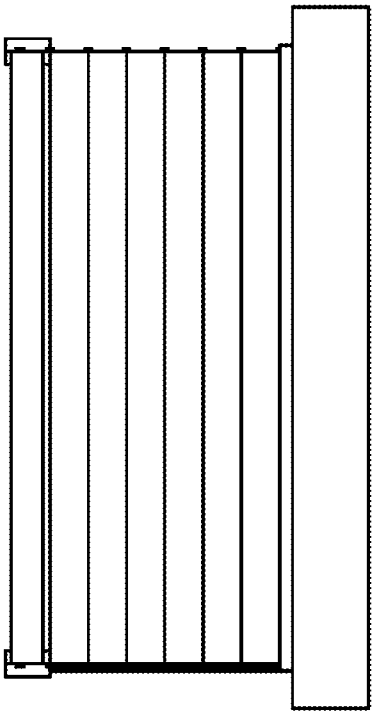
Figure 9A:
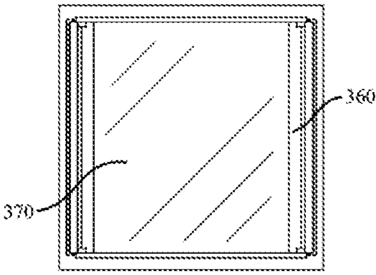
FIG. 9A—FIG. 9D illustrate the views of the invention in a fully open state.
Figure 9B:
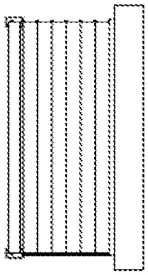
Figure 9C:
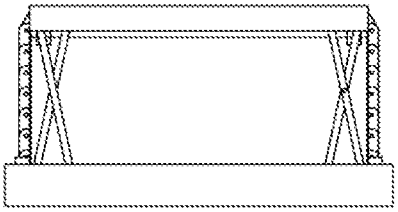
Figure 9D:
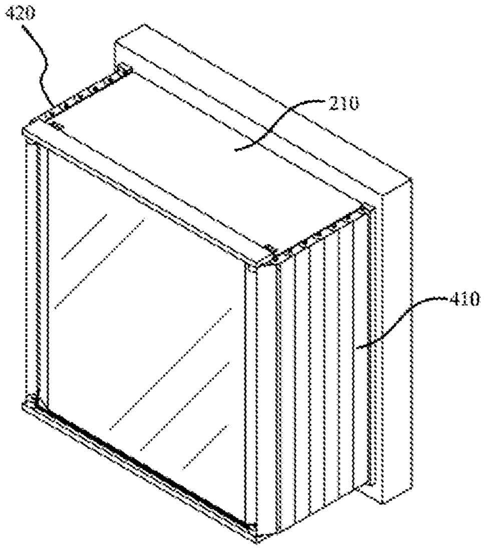

As shown in FIG. 2A, the vertical translation plate 300 comprises a pair of sliding slots 340. The two sliding slots 340 are located at the indoor surface of the vertical translation plate 300. The two sliding slots 340 are symmetry on the right side and left side. A pair of first horizontal turning plate sliders 216 slides along the sliding slots 340. A pair of second horizontal turning plate sliders 226 slides along the sliding slots 340. FIG. 8A—FIG. 8C show side views of the invention in different statuses. Particularly, FIG. 8B shows a perspective side view of the invention in a half-open state. The second end 214 of the first horizontal turning plate 210 is pivoted to the pair of first horizontal turning plate sliders 216; the second end 224 of the second horizontal turning plate 220 is pivoted to the pair of second horizontal turning plate sliders 226.

The vertical translation plate 300 comprises a bottom portion 350 having a bottom portion sliding rail 352; the second horizontal edge 120 comprises an edge sliding rail 122; a pair of bottom support mechanisms 500 are mounted between the bottom portion 350 and the second horizontal edge 120.

Figure 4A:
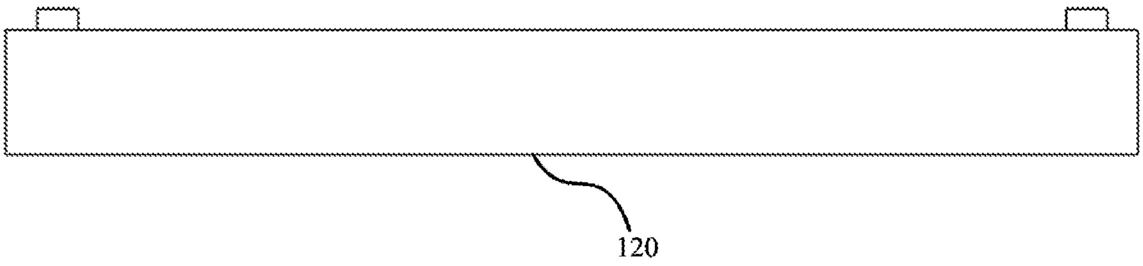
FIG. 4A—FIG. 4C show bottom views of the invention in different statuses.
Figure 4B:
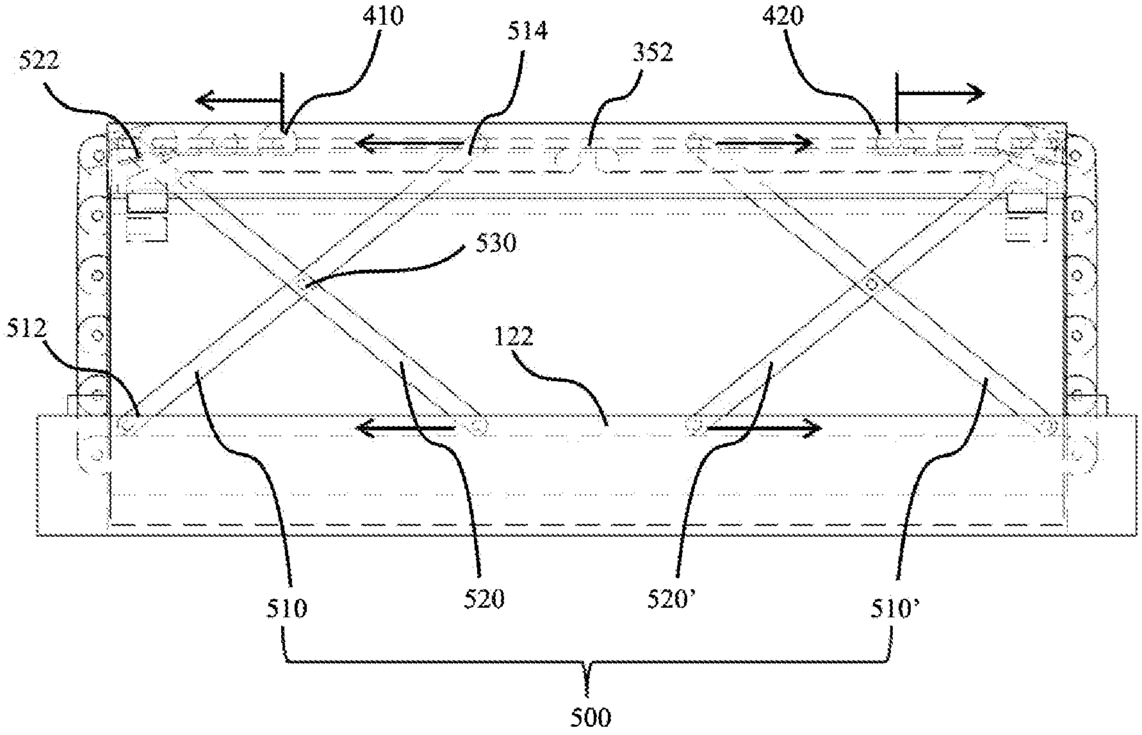
Figure 4C:
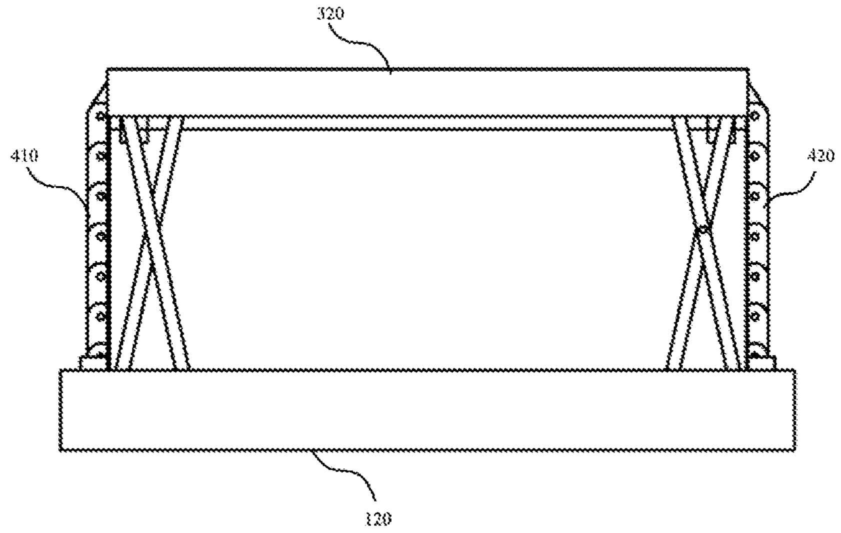

FIG. 4A—FIG. 4C show bottom views of the invention in different statuses. FIG. 4A shows a bottom view of the invention in a fully closed state; FIG. 4B shows a perspective bottom view of the invention in a half-open state; FIG. 4C shows a bottom view of the invention in a full-open state.

The bottom support mechanisms 500 are symmetrical on the left and right sides, supporting the entire window mechanism from the bottom and allowing the vertical translation plate 300 to remain upright and not tilted as it is pushed outward or pulled back inward.

Each bottom support mechanism 500 comprises a first supporting rod 510, a second supporting rod 520, and a pivot 530; the first supporting rod 510 and the second supporting rod 520 cross at the pivot 530; one end 512 of the first supporting rod 510 is rotatably mounted on one end of the second horizontal edge 120, another end 514 of the first supporting rod 510 is slidingly pivoted to the bottom portion sliding rail 352; one end 522 of the second supporting rod 520 is rotatably mounted on one end of the bottom portion 350; another end 524 of the second supporting rod 520 is slidingly pivoted to the edge sliding rail 122.

Figure 5:
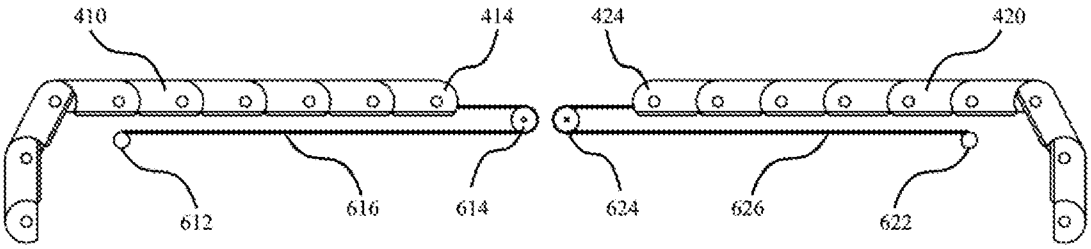
FIG. 5 shows the structure of the first and second retraction mechanisms.

The bottom support mechanisms 500 and the vertical translation plate 300 restrain and control all other structures of the present invention to ensure the movement of each structure. FIG. 5 shows the structure of the first and second retraction mechanisms.

The top protruding portion 310 comprises a first retraction mechanism 610 and a second retraction mechanism 620. The first and second retraction mechanisms are symmetry on the right side and left side. The first and second retraction mechanisms are to pull the vertical sliding assemblies 410, and 420 back when the hideable window is going to close.

The first retraction mechanism 610 comprises a first coil spring 612, a first fixed pulley 614, and a first steel wire 616; the first coil spring 612 comprises a first fixed end and a first pull-out end; the first fixed end is mounted at one end of the top protruding portion 310; the first fixed pulley 614 is rotatably mounted near the middle of the top protruding portion 310; the first steel wire 616 is wound around the first fixed pulley 614 and connects the first pull-out end and the first sliding end 414.

The second retraction mechanism 620 comprises a second coil spring 622, a second fixed pulley 624, and a second steel wire 626; the second coil spring 622 comprises a second fixed end 6220 and a second pull-out end 6222; the second fixed end 6220 is mounted at one end of the top protruding portion 310; the second fixed pulley 624 is rotatably mounted near middle of the top protruding portion 310; the second steel wire 626 is wound around the second fixed pulley 624 and connects the second pull-out end 6222 and the second sliding end 424.

In another embodiment, the vertical translation plate 300 is transparent.

In another embodiment shown in FIG. 9, the middle part of the vertical translation plate 300 comprises a mounting frame 360, and a transparent panel 370 is mounted at the mounting frame 360.

In another embodiment, the vertical sliders 400 are transparent.

The user can choose which part is transparent or opaque as desired.

In another embodiment, the first horizontal turning plate 210 and the second horizontal turning plate 220 are symmetric; since the vertical translation plate 300 is always kept vertical and the position of vertical direction is unchanged during the opening/closing process when being rotated, the first horizontal turning plate 210 and the second horizontal turning plate 220 maintain the same angles with the horizontal plane, opposite rotation direction, and same rotation speed during the rotation process.

In order to better illustrate the working process of the hideable window, the following figures are provided. FIG. 6A—FIG. 6E show the different views of the invention in the closed state. FIG. 7A—FIG. 7G are the multiple views of the invention in a half-open state. FIG. 9A—FIG. 9D illustrate the views of the invention in a fully open state.

FIGS. 6A-6E, 7A—7G, 8A—8C, and 9A—9D illustrate the hideable bay window's different status and transformation from a hidden status (fully-closed status) to an expanded status (fully open state), or from an expanded status to a hidden status. In the hidden status, the first horizontal turning plate 210, second horizontal turning plate 220, vertical translation plate 300, first vertical sliding assembly 410, and second vertical sliding assembly 420 are retracted to the inside of the window frame 10. When the hidable is in the transformation process, the first horizontal turning plate 210 and the second horizontal turning plate 220 rotate about their respective pivots, the vertical translation plate 300 moves towards or against the window frame 10, the first vertical sliding assembly 410, and the second vertical sliding assembly 420 moves along the exterior sliding rails 330. In the expanded status, the first horizontal turning plate 210, second horizontal turning plate 220, vertical translation plate 300, first vertical sliding assembly 410, and second vertical sliding assembly 420 form a bay window.

In FIG. 6A—FIG. 6E, the hideable bay window is in a fully-closed status. The first vertical sliding assembly 410 and the second vertical sliding assembly 420 cover the front side of the window frame 10 (as shown in FIG. 6B and FIG. 6E). The first horizontal turning plate 210 and the second horizontal turning plate 220 cover the back side of the window frame 10 (as shown in FIG. 6C). All the movable mechanisms are stored within the window frame 10. The entire window in this state takes up minimal space and is easily transportable.

Figure 7G:
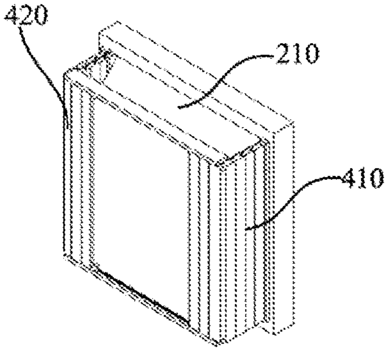

FIG. 7A—FIG. 7G are the multiple views of the invention in a half-open state from hidden to expanded status or from expanded status to hidden status. The first vertical sliding assembly 410 and the second vertical sliding assembly 420 are opened/retracted symmetrically at the same time (as shown in FIG. 7A and FIG. 7G). The first horizontal turning plate 210 and the second horizontal turning plate 220 are also opened/retracted symmetrically at the same time (as shown in FIGS. 7C, 7F, 7G). The bottom support mechanisms 500 are opened/retracted symmetrically at the same time (as shown in FIGS. 7D, 7E).

FIG. 8B shows an opening process. In FIG. 8B, the first horizontal turning plate 210 flips clockwise while the second horizontal turning plate 220 flips counterclockwise. The pair of first horizontal turning plate sliders 216 slides upward along the sliding slots 340 while the pair of second horizontal turning plate sliders 226 slides downward along the sliding slots 340. The vertical translation plate 300 is moving outward at the same time.

FIG. 4B shows a perspective bottom view of an opening process. During the process, the first supporting rod 510 rotates counterclockwise, and the second supporting rod 520 rotates clockwise while the first supporting rod 510' rotates clockwise, and the second supporting rod 520' rotates counterclockwise symmetrically. At the same time, the first vertical sliding assembly 410 and the second vertical sliding assembly 420 are opening symmetrically.

FIGS. 9A-9D illustrate the views of the invention in a fully open state.

In FIGS. 9A-9D, the first horizontal turning plate 210, the second horizontal turning plate 220, the vertical translation plate 300, the first vertical sliding assembly 410, and the second vertical sliding assembly 420 form together an enclosed space that extends from the interior to the exterior. Users can choose the material of the window 370 and vertical sliders 400 according to their preferences in order to protect privacy as well as to get the desired view.

In addition, when the user chooses transparent material for the horizontal turning plates, the vertical sliding assembly, and the vertical translation plate/window, the user can use the hidable bay window as a fixed window in closed status and use it as a bay window in open status.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

Except as otherwise stated immediately above, nothing that has been stated or illustrated is intended or should be interpreted to cause a dedication of any component, step, feature, object, benefit, advantage, or equivalent to the public, regardless of whether it is recited in the claims.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A hideable bay window, comprising a window frame, a first horizontal turning plate, a second horizontal turning plate, a vertical translation plate, a first vertical sliding assembly, and a second vertical sliding assembly; wherein, the window frame comprises a first horizontal edge and a second horizontal edge; a first end of the first horizontal turning plate is hinged to the first horizontal edge; a second end of the first horizontal turning plate is slidingly pivoted to the vertical translation plate; a first end of the second horizontal turning plate is hinged to the second horizontal edge; a second end of the second horizontal turning plate is slidingly pivoted to the vertical translation plate, the window frame comprises a first vertical edge and a second vertical edge; the vertical translation plate comprises a top protruding portion with a top exterior sliding rail and a bottom protruding portion with a bottom exterior sliding rail; the top exterior sliding rail and the bottom exterior sliding rail are set opposite each other to form a pair of exterior sliding rails; one end of the first vertical sliding assembly is fixed on the first vertical edge; another end of the first vertical sliding assembly is a first sliding end slides in the exterior sliding rails; one end the second vertical sliding assembly is fixed on the second vertical edge; another end of the second vertical sliding assembly is a second sliding end slides in the exterior sliding rails, the first vertical sliding assembly and the second vertical sliding assembly each consist of a plurality of vertical sliders hinged successively along sliding direction, and each vertical slider comprises a pair of arcuate protruding portions at one end and a pair of arcuate recessed portions matching shape and size of the pair of arcuate protruding portions at another end; each arcuate recessed portion comprises a removable rotation connecting rod; each arcuate protruding portion comprises a rod hole to accommodate the removable rotation connecting rod of another vertical slider.

2. The hideable bay window of claim 1, wherein the removable rotation connecting rod comprises a non-threaded portion and a threaded portion; length of the non-threaded portion is larger than length of the rod hole; the arcuate recessed portion comprises a threaded hole for the threaded portion of the removable rotation connecting rod.

3. The hideable bay window of claim 1, wherein the vertical translation plate comprises a pair of sliding slots; a pair of first horizontal turning plate sliders slide along the sliding slots; a pair of second horizontal turning plate sliders slide along the sliding slots; the second end of the first horizontal turning plate is pivoted to the pair of first horizontal turning plate sliders; the second end of the second horizontal turning plate is pivoted to the pair of second horizontal turning plate sliders.

4. The hideable bay window of claim 1, wherein the vertical translation plate comprises a bottom portion having a bottom portion sliding rail; the second horizontal edge comprises an edge sliding rail; a pair of bottom support mechanisms are mounted between the bottom portion and the second horizontal edge; each bottom support mechanism comprises a first supporting rod, a second supporting rod, and a pivot; the first supporting rod and the second supporting rod cross at the pivot; one end of the first supporting rod is rotatably mounted on one end of the second horizontal edge, another end of the first supporting rod is slidingly pivoted to the bottom portion sliding rail; one end of the second supporting rod is rotatably mounted on one end of the bottom portion; another end of the second supporting rod is slidingly pivoted to the edge sliding rail.

5. The hideable bay window of claim 1, wherein the top protruding portion comprises a first retraction mechanism and a second retraction mechanism, wherein, the first retraction mechanism comprises a first coil spring, a first fixed pulley, and a first steel wire; the first coil spring comprises a first fixed end and a first pull-out end; the first fixed end is mounted at one end of the top protruding portion; the first fixed pulley is rotatably mounted near middle of the top protruding portion; the first steel wire is wound around the first fixed pulley and connects the first pull-out end and the first sliding end;

the second retraction mechanism comprises a second coil spring, a second fixed pulley, and a second steel wire; the second coil spring comprises a second fixed end and a second pull-out end; the second fixed end is mounted at one end of the top protruding portion; the second fixed pulley is rotatably mounted near middle of the top protruding portion; the second steel wire is wound around the second fixed pulley and connects the second pull-out end and the second sliding end.

6. The hideable bay window of claim 1, wherein each vertical slider comprises a first sealing pad where the vertical slider contacts the first horizontal turning plate; each vertical slider comprises a second sealing pad where the vertical slider contacts the second horizontal turning plate.

7. The hideable bay window of claim 6, wherein each first sealing pad and each second sealing pad are elastic.

8. The hideable bay window of claim 1, wherein the vertical translation plate is transparent.

9. The hideable bay window of claim 1, wherein the vertical sliders are transparent.

10. The hideable bay window of claim 1, wherein the first horizontal turning plate and the second horizontal turning plate are symmetric; when being rotated, the first horizontal turning plate and the second horizontal turning plate maintain same angles with horizontal plane, opposite rotation direction, and same rotation speed.

* * * * *